US 12,425,833 B2

(12) United States Patent
Sukojo

(10) Patent No.: US 12,425,833 B2
(45) Date of Patent: Sep. 23, 2025

(54) METHODS AND SYSTEMS FOR INTERNATIONAL ROAMING UTILIZING A TEMPORARY ROAMING PROFILE WITH A PURCHASED ROAMING PASS

(71) Applicant: T-Mobile Innovations LLC, Overland Park, KS (US)

(72) Inventor: Andiputranto Sukojo, Sammamish, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 390 days.

(21) Appl. No.: 18/189,156

(22) Filed: Mar. 23, 2023

(65) Prior Publication Data
US 2024/0323667 A1    Sep. 26, 2024

(51) Int. Cl.
*H04W 8/00*     (2009.01)
*H04M 15/00*    (2006.01)
*H04W 8/12*     (2009.01)

(52) U.S. Cl.
CPC .......... *H04W 8/12* (2013.01); *H04M 15/64* (2013.01); *H04M 15/8038* (2013.01)

(58) Field of Classification Search
CPC .......... H04W 8/12; H04W 4/24; H04W 8/18; H04M 15/64; H04M 15/8038
See application file for complete search history.

(56) References Cited

U.S. PATENT DOCUMENTS

| | | | |
|---|---|---|---|
| 9,763,176 B2 * | 9/2017 | Lair | H04W 48/12 |
| 10,750,353 B2 * | 8/2020 | Erginler | H04M 15/835 |
| 2005/0113091 A1 * | 5/2005 | Rodriguez | H04W 8/06 |
| | | | 455/406 |
| 2009/0061859 A1 * | 3/2009 | Bengtsson | H04M 15/00 |
| | | | 455/433 |
| 2017/0257886 A1 * | 9/2017 | Adjakple | H04W 74/04 |
| 2021/0306933 A1 * | 9/2021 | Lonkar | H04M 15/64 |

* cited by examiner

*Primary Examiner* — Pakee Fang

(57) ABSTRACT

A roaming application in a core network receives a request to create a temporary roaming profile for a roaming user in the mobility management entity (MME) in response to a roaming pass being purchased by the roaming user for a user equipment (UE), stores, in the MME, the temporary roaming profile for the roaming user, wherein the temporary roaming profile includes an identity of the UE and an access point name (APN) associated with the roaming network, receives an attach message from the UE when the UE is located within a coverage area of the roaming network, wherein the attach message includes the identity of the UE, and creates a bearer between the UE and a packet network data gateway (PGW) of the roaming network based on the APN associated with the roaming network indicated in the temporary roaming profile for the roaming user.

18 Claims, 8 Drawing Sheets

METHODS AND SYSTEMS FOR INTERNATIONAL ROAMING UTILIZING A TEMPORARY ROAMING PROFILE WITH A PURCHASED ROAMING PASS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Roaming is the ability of a user device to access a voice or data connection outside a geographical coverage area provided by a home network to which a user is subscribed. The user device may be subscribed with a home wireless service provider operating the home network. The home wireless provider may have a roaming agreement with other wireless service providers that operate outside the coverage area supported by the home wireless provider, such that subscribers of the home wireless provider may be permitted to roam into roaming networks of the other wireless providers. Common data roaming services include multimedia messaging services (MMS), electronic message pushing, handset Internet, mobile broadband, etc. The usage of mobile data services is typically measured in kilobytes (KB) or megabytes (MB), which refers to the volume of data transmitted for the service used. When the user device is within the geographical area covered by the roaming network and requests attachment to the roaming network, the roaming network may provide access to a packet data network (e.g., the Internet) by accessing a gateway at the home network when the subscription plan for the user includes data roaming. However, a data roaming enabled subscription plan is currently very expensive and/or may require the device to include a physical Subscriber Identity Module (SIM) slot or an embedded universal integrated circuit card (eUICC) to implement an electronic-SIM (eSIM) profile.

SUMMARY

In an embodiment, a method performed by a core network in a roaming network associated with a roaming wireless service provider is disclosed. The method comprises receiving, by a roaming application in the core network, a request to create a temporary roaming profile for a roaming user in a mobile management entity (MME) of the core network in response to a roaming pass being purchased by the roaming user for a user equipment (UE). The roaming network is external to a home network registered with the UE. The method further comprises storing, in the MME, the temporary roaming profile for the roaming user, in which the temporary roaming profile includes an identity of the UE and an access point name (APN) associated with the roaming network. The method further comprises transmitting, by the roaming application to the UE, an instruction to set an APN setting at the UE to the APN associated with the roaming network, and receiving, by the MME in the core network, an attach message from the UE when the UE is located within a coverage area of the roaming network, in which the attach message includes the identity of the UE and the APN associated with the roaming network. The method further comprises creating, by the MME, a bearer between the UE and a Packet Network Data Gateway (PGW) of the roaming network based on the APN associated with the roaming network indicated in the temporary roaming profile for the roaming user in response to the MME receiving, from a home subscriber server (HSS) in the home network, an indication that the UE is authorized to access the roaming network.

In yet another embodiment, a method performed by a core network in a roaming network associated with a roaming wireless service provider is disclosed. The method comprises creating, in a mobile management entity (MME) of the core network, a temporary roaming profile for a roaming user in response to roaming pass being purchased by the roaming user for a user equipment (UE). The roaming network is external to a home network registered with the UE, and the temporary roaming profile includes an identity of the UE and an access point name (APN) associated with the roaming network. The method further comprises receiving, by the MME, an attach message from the UE when the UE is located within a coverage area of the roaming network, in which the attach message includes the identity of the UE and an APN associated with the home network. The method further comprises obtaining, by the MME, the APN associated with the roaming network from the temporary roaming profile, determining, by the MME, that the APN associated with the roaming network is to be used to provide a data connection to a packet data network instead of the APN associated with the home network received in the attach message, and creating, by the MME, a bearer between the UE and a packet network data gateway (PGW) of the roaming network based on the APN associated with the roaming network indicated in the temporary roaming profile for the roaming user in response to the MME receiving, from a home subscriber service (HSS) in the home network, an indication that the UE is authorized to access the roaming network.

In yet another embodiment, a system comprises a core network located within a roaming network is disclosed. The core network comprises at least one processor, at least one non-transitory memory, a mobility management entity (MME), and a roaming application, stored in the at least one non-transitory memory. The roaming application causes the at least one processor to be configured to receive a request to create a temporary roaming profile for a roaming user in the MME in response to a roaming pass being purchased by the roaming user for a user equipment (UE), in which the roaming network is external to a home network registered with the UE, store, in the MME, the temporary roaming profile for the roaming user, in which the temporary roaming profile includes an identity of the UE and an access point name (APN) associated with the roaming network, receive an attach message from the UE when the UE is located within a coverage area of the roaming network, in which the attach message includes the identity of the UE, and create a bearer between the UE and a packet network data gateway (PGW) of the roaming network based on the APN associated with the roaming network indicated in the temporary roaming profile for the roaming user in response to an indication that the UE is authorized to access the home network and the roaming network being received from a home subscriber server (HSS) in the home network.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
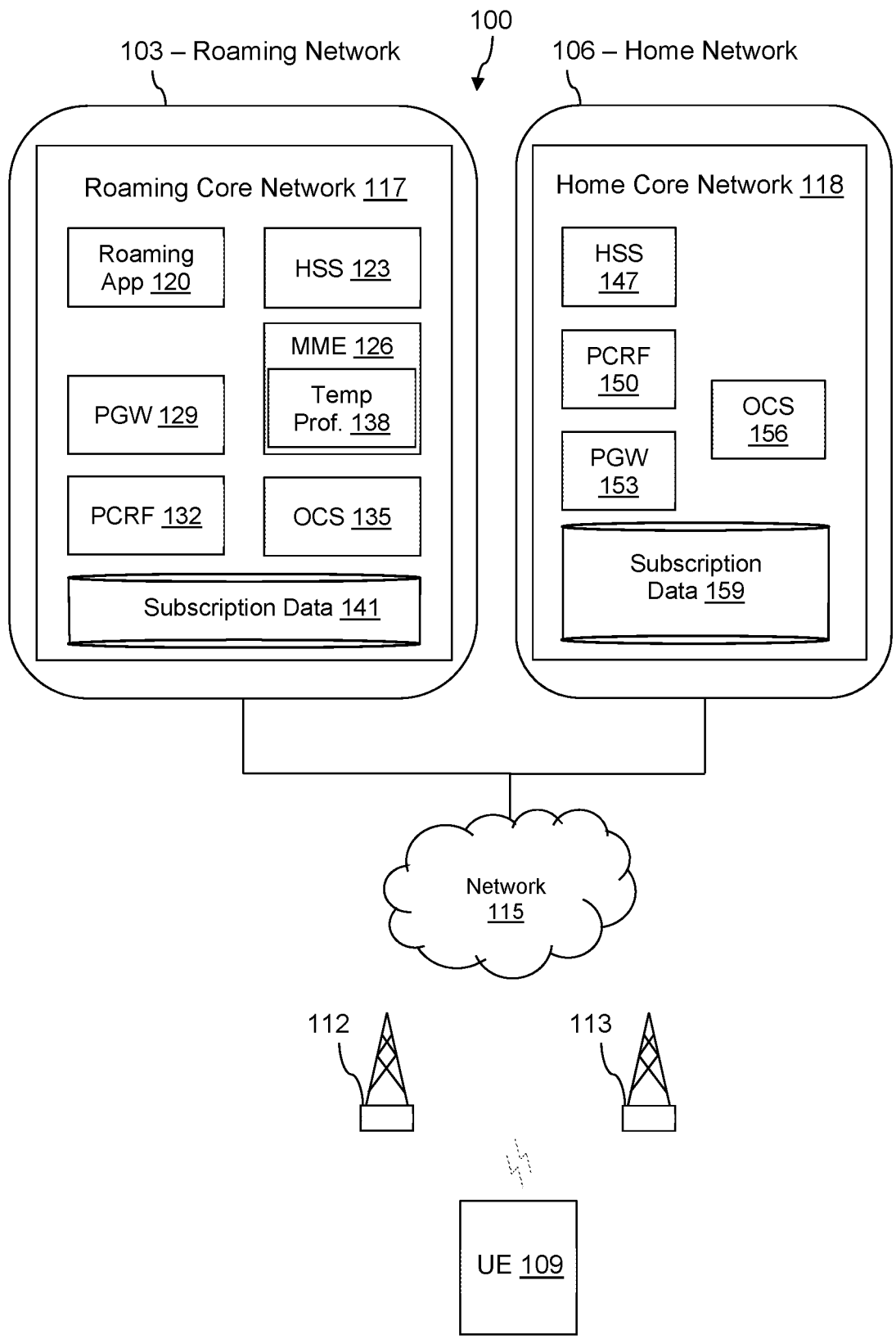
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As mentioned above, enabling data roaming on a wireless device may be complicated and limited by certain restrictions. First and foremost, data roaming is usually expensive from the standpoint of the customer. For example, a customer may purchase a data roaming pass for a device through a home network wireless service provider under a subscription plan registered with the device. The data roaming usage may be metered according to various parameters of data roaming pass when the device is outside the coverage area of the home network. The data roaming pass is usually much more expensive for similar bandwidth usage and quality of service (QoS) parameters when compared to the in-network data plan costs for the same device. In this way, a data roaming pass may often be purchased from the home network wireless provider to enable the device to connect to other roaming networks outside of the home network when the device travels outside the coverage area provided by the home network. In other cases, a data roaming pass may be purchased from a roaming network wireless provider to enable the device to connect to a packet data network via the roaming network. However, such a data roaming pass purchased from the roaming network wireless provider is still expensive, may include a phone number change, and may only be provisioned on an eSIM capable device, while many devices on the market are not yet eSIM capable.

Another method of enabling data roaming on a wireless device may involve the user purchasing another SIM card or eSIM profile from a roaming network wireless service provider. In this case, the user may insert the other SIM card into a SIM card slot in the wireless device, or the user may request that the other eSIM profile be provisioned onto the device, when the device enters the coverage area of the roaming network. However, most home network wireless service providers may not permit registered devices to change SIM cards or provision different eSIM profiles until the device itself has been fully paid. Most subscribers pay for devices according to a payment plan, such that completion of the payment plan may take up to two to three years. During this time, the home network service provider may prohibit a SIM card or eSIM profile change at the device (i.e., the device may be locked upon detection of a SIM card or eSIM profile change). Therefore, current methods of data roaming are expensive and heavily restrictive, often even involving a phone number change of the device.

Another drawback of current methods of data roaming is that the device may still forward traffic through a gateway of the home network while roaming, even though the gateway of the roaming network is likely much closer in distance to the roaming device. Thus, current methods of data roaming are largely inefficient from the network perspective. In addition, since the traffic is being forwarded through the gateway of the home network, the device cannot receive the benefits and privileges of the roaming network and the roaming country. For example, certain countries prohibit access to social media content, and the home network providers in these countries operate to prohibit social media content access under all circumstances, regardless of whether the device is roaming or not. Therefore, when the device is roaming in a country that permits social media content access, the device may still be restricted from social media access since the traffic passes through the gateway of the home network.

The present disclosure addresses the foregoing technical problems by providing a technical solution in the technical field of data connections and telecommunications. Embodiments of the present disclosure are directed to a system for providing data roaming to a user equipment (UE) that is registered with a home network but located in a coverage area supported by a roaming network, external to the home network.

In an embodiment, a user behind the UE may purchase a roaming pass directly from the roaming wireless network service provider (also referred to herein as the "roaming provider"), either via a website or application belonging to the roaming provider, or even at a retail store of the roaming provider. The roaming pass may be used to provide the UE a connection to a packet data network (e.g., the Internet) using the roaming network resources when the UE is in the coverage area of the roaming network, instead of the home network resources. By using the roaming network resources to access the packet data network instead of going back to the home network, the embodiments disclosed herein are directed to a far more network efficient method of providing data roaming services to a user. In addition, the user may retain the original phone number associated with the UE, instead of having to change a SIM card or provision a new eSIM profile with a different phone number.

When purchasing the roaming pass, the user may provide information to the roaming provider, either via the website or application, or to an employee at the retail store. The information may include identification information and home country/network information. For example, the identification information may include an identity of the UE, such as, for example, a Mobile Station International Subscriber Directory Number (MSISDN) or an International Mobile Subscriber Identity (IMSI) of the UE. The home country/network information may include the country in which the user originally resides, and data identifying the home network provider with which the user is registered. The user may also provide payment information for the roaming pass at the time of purchasing the roaming pass. The user may also specify various parameters or policies for providing data roaming services to the UE according to the roaming pass. For example, the parameters may include a duration of the roaming pass (e.g., start time of activation and end time of termination), a maximum or unlimited amount of data usage, QoS requirements (e.g., bandwidth, latency, jitter, etc.), etc.

After the roaming pass has been purchased, a Mobility Management Entity (MME) at the roaming network may communicate with a Home Subscriber Server (HSS) at the home network to authenticate and authorize the UE at the roaming network. The MME may send an authentication request to the HSS in the home network to authenticate the UE with both the roaming network and the home network, in which the authentication request includes the identity of the UE. The HSS at the home network may access a subscription database storing subscriber data pertaining to the UE when the UE is registered with the home network service provider under a subscription plan. For example, the subscription data may include the identity of the UE.

In addition, the home network and the roaming network may be parties to a roaming agreement, whereby subscribers of one network are permitted to use the other network when roaming, according to variable data rates. The HSS may authenticate the UE with the home network by verifying that the identity of the UE is indicated in the subscription data at the home network provider when the roaming provider and home network provider are both parties of a roaming agreement. In such a case, the HSS may transmit an authentication response back to the MME, the authentication response indicating that the UE is indeed authorized to access both the home network and the roaming network pursuant to the roaming agreement.

After authenticating the UE with the roaming network, a roaming application in a core network of the roaming network may be triggered to create a temporary roaming profile for the roaming user operating the UE to provision the UE into the roaming network according to the parameters of the roaming pass. The temporary roaming profile may be stored at the MME in the core network of the roaming network. The roaming application may be a separate software module of the core network, or the roaming application may implemented by the MME as part of the MME.

The roaming application may store the identification information, home country/network information, payment information, and specified parameters in association with the roaming pass in the temporary roaming profile. The roaming application may also identify and store an access point name (APN) in association with the roaming pass in the temporary roaming profile, in which the APN is associated with the roaming network (also referred to herein as the "roaming APN"). The roaming APN may be different from another APN assigned to the UE in the home network, and the roaming APN may permit the UE to access content and services in or via the roaming network.

An APN may be an identifier used in a Global System for Mobile Communications (GSM) network (also in 3G/EDGE networks) for identifying a General Packet Radio Service (GPRS) bearer service. An APN may define the type of bearer service that is provided in the UE's packet data connection and identifies an external network that is accessible from the UE. An APN may further include several attributes that define how the UE can access the external network. Each network (e.g., the home network and the roaming network) may have separate APNs or a separate pool of APNs designated for UEs that are located within the coverage area of the network.

An APN may be typically used in a mobile network to identify "home" users (i.e., users registered with the network provider) such that these users may access services in the home network. In a standard data roaming procedure, the UE may continue to use the APN registered with the home network for a data connection since the UE may still use the home network gateway to access a packet data network when roaming. As described above, such a method of data roaming is largely inefficient from the network perspective.

However, the embodiments disclosed herein provide data roaming to the UE using the roaming APN instead of the APN registered with the home network, as further described herein. Providing a data connection using the roaming APN is not only far more resource efficient, but also ensures that the user receives the benefits and privileges of the roaming network, rather than being limited by the restrictions imposed on the home network. For example, as mentioned above, certain countries have blocked or restricted access to social media pages and applications. Users may be registered with a home network in these countries, and may at some point travel to the United States, which does not have such restrictions. These roaming users may purchase a roaming pass from a roaming provider in the United States to access the Internet via the roaming network in the United States instead of the home network in the restricted country. When data roaming services are provided to the user according to the embodiments disclosed herein, the user may be permitted, when roaming in the United States, to access the social media pages and related applications that may have been prohibited in their home countries.

In some embodiments, the roaming APN may be set as the APN for the roaming UE based on the operating system running on the roaming UE. For example, one operating system may permit the user to set the APN at the UE, while another operating system may prohibit the user from manually setting the APN at the UE. As further described below, a first embodiment is directed to setting the APN to be the roaming APN at the UE, and a second embodiment is directed to setting the APN of the UE to be the roaming APN at the core network in the roaming network (i.e., when the UE is not permitted to set the APN).

In the first embodiment, the roaming application may transmit an instruction to set the APN at the UE to be the roaming APN after the temporary roaming profile is created at the MME. The instruction may include the roaming APN and any or all of the information from the temporary roaming profile. In an embodiment, the UE may be automatically triggered to change the APN setting of the UE, for example, when the UE enters the coverage area of the roaming network and/or when a start time of the roaming pass (as selected/entered upon purchase of the roaming pass) has passed. In another embodiment, a notification may be displayed on the UE instructing the user to manually change the APN setting of the UE. For example, the notification may include the location of the APN setting on the UE such that the user may easily access the settings page to enter or select the roaming APN (instead of the APN of the home network). For example, the UE may display the APN for the home network and the roaming APN for the roaming network such that the user may select the roaming APN under the APN setting. Alternatively, the user may manually type in the roaming APN under the APN setting based on the roaming APN received in the instruction. In either case, the UE itself may adjust the APN setting of the UE such that the roaming APN is used to set up a connection to the packet network data gateway (PGW) between the roaming network and a packet data network.

Once the APN setting at the mobile device has been set to the roaming APN, the UE may subsequently send an attach message to the MME at the core network of the roaming network, for example, when the UE has entered the coverage area of the roaming network. The attach message may include an identity of the UE and the roaming APN. The attach message is described herein as a single message, but may be implemented as multiple messages, as should be appreciated herein.

After the MME receives the attach message from the UE, the MME may determine whether the UE is registered with the roaming network as a subscriber or as a roaming user (i.e., under a roaming pass), for example, based on whether the MME authenticated the UE with the HSS of the home network. The MME may be updated to reflect the identity and location of the UE. The MME may then establish a data connection for the UE using the roaming network by creating a bearer between the UE and the PGW of the roaming network based on the roaming APN.

In the second embodiment, the MME cannot send an instruction to the UE to set the roaming APN as the APN on the UE because the UE may not be permitted to alter the APN. Therefore, contrary to the first embodiment, the attach message in the second embodiment that is sent from the UE to the MME may by default include the APN registered with the home network. After receiving the attach message, the MME may extract the home network APN carried in the attach message. The MME may then obtain the roaming APN indicated in the temporary roaming profile created for the UE. The MME may then compare the home network APN carried in the attach message with the roaming APN indicated in the temporary roaming profile. When the home network APN carried in the attach message is different from the roaming APN indicated in the temporary roaming profile, the MME may, by default, use the roaming APN indicated in the temporary roaming profile to set up a data connection for the UE. In other words, the MME may overwrite the home network APN received in the attach message with the roaming APN included in the temporary roaming profile. As described above, the MME may then establish a data connection for the UE using the roaming network by creating a bearer between the UE and the PGW of the roaming network based on the roaming APN.

In this way, the embodiments disclosed herein provide for a far more network and resource efficient method by which to provide data roaming services to a roaming UE. Moreover, the embodiments disclosed herein provide the data roaming services to the UE at a less costly rate since the roaming network is being used to provide the data roaming services, which is more proximate to the UE than the home network when the UE is roaming. In addition, the UE may maintain the same phone number in both the roaming and home networks, while still receiving all the benefits and privileges of being a full subscriber of the roaming network.

Turning now to FIG. 1, a communication system 100 is described. The system 100 comprises a roaming network 103, a home network 106, a user equipment (UE) 109, cell sites 112-113, and a network 115. The communication system 100 may be configured to provide roaming services to the UE 109 when the UE 109 travels from a coverage area supported by the home network 106 to a coverage area supported by the roaming network 103.

The UE 109 may be a cell phone, a mobile phone, a smart phone, a personal digital assistant (PDA), a wearable computer, a laptop computer, a tablet computer, or a notebook computer. The UE 109 may communicatively couple to the roaming network 103 and/or the network 115 via the cell site 112, and the UE 109 may communicatively couple to the home network 106 and/or the network 115 via the cell site 113. The cell sites 112-113 may provide the UE 109 a wireless communication link to the roaming network 103, home network 106, and/or network 115 according to a 5G, a long term evolution (LTE), a code division multiple access (CDMA), or a global system for mobile communications (GSM) wireless telecommunication protocol.

The network 115 may be one or more private networks, one or more public networks, the Internet, or a combination thereof. While FIG. 1 shows the roaming network 103 and the home network 106 as being separate from the network 115, it should be appreciated that, in some embodiments, at least a portion of the roaming network 103 and/or the home network 106 may be part of the network 115.

The home network 106 may be operated by a home wireless network provider (or telecommunications carrier) at a home country of the user owning the UE 109. The roaming network 103 may be operated by a roaming or visiting wireless network provider at a country visited by the user. Both the roaming network 103 and the home network 106 may include both a core network 117, 118, and a RAN. The RANs included in each of the roaming network 103 and the home network 106 may include the access network containing the radio elements of a cell network. As shown in FIG. 1, the roaming network 103 includes the roaming core network 117, while the home network 106 includes the home core network 118. The roaming core network 117 and the home core network 118 may include the elements that manage the subscriber information, call setup and routing, and related system supports. In an embodiment, the roaming core network 117 and the home core network 118 may each be an evolved packet core (EPC) core network. The roaming core network 117 and the home core network 118 may each be configured to implement a 5G, a LTE, a CDMA, or a GSM wireless telecommunication protocol. In one embodiment, the roaming core network 117 and/or the home core network 118 may be a 3rd Generation Partnership Project (3GPP) Evolved Packet System (EPS).

As shown in FIG. 1, the roaming core network 117 includes a roaming application 120, a HSS 123, an MME 126, a PGW 129, a policy and charging rules function (PCRF) 132, and an online charging system (OCS) 135. The roaming core network 117 may also include a database storing subscription data 141. The roaming application 120 may perform one or more of the steps shown in FIGS. 2A-B, 3, and 4 to provide roaming data services to the UE 109 in a more efficient and enhanced manner, as further described herein. The HSS 123 is a master user database that stores user profiles, performs authentication and authorization of the user, and may provide information about the physical location of user, all of which may be performed to handle data sessions.

The MME 126 may be responsible for providing mobility session management for the system 100, and for supporting subscriber authentication, roaming, and handovers to other networks. As described herein, the MME 126 may be responsible for authenticating the UE 109 with the roaming network 103, by querying the HSS 147 at the home network 106 to receive authentication information regarding the UE 109. The MME 126 may also be responsible for receiving an attach message from the UE 109, verifying the parameters for providing roaming data services to the UE 109 according to the purchased roaming pass, and providing roaming data services to the UE 109 via the PGW 129 using the roaming APN assigned to the roaming network 103.

The MME 126 may store information about the subscribers roaming within a coverage area of the roaming network 103, or a mobile switching center location area. The MME 126 may be responsible for monitoring a subscriber location within a coverage area of the MME 126, determine whether a subscriber may access a particular service, delete records of inactive subscribers, accept information to be passed to the HSS 123 of the roaming network 103, etc. In some embodiments, the MME 126 may store temporary roaming profiles 138 (shown in FIG. 1 as "temp. prof. 138") for roaming devices, such as UE 109, that move into the coverage area supported by the roaming network 103. As described herein, a temporary roaming profile 138 may be created for a UE 109 and stored at the MME 126 in response to the user purchasing a roaming pass for the UE 109 from the roaming provider. The temporary roaming profile 138 may be created and stored at the MME 126 on a temporary basis, for at least the duration of the roaming pass (i.e., at least as long as the roaming pass is valid and not expired). The MME 126 may also communicate with the home core network 118 to authenticate the UE 109 with the home network 106 and obtain additional data from the home core network 118 that may be used by the roaming network 103 to provide roaming data services to the UE 109.

The PGW 129 is the boundary between the roaming core network 117 and external packet networks (e.g., Internet). The PGW 129 may be responsible for assigning Internet Protocol (IP) addresses to terminals, inspecting packets, supporting selected functionalities in the network and charging accordingly. The roaming APN may connect the UE 109 to the packet data network through the PGW 129.

The PCRF 132 may be a software or hardware node in the roaming core network 117 that supports service data flow detection, policy enforcement, and flow-based charging. In some cases, the PCRF 132 may perform data flow detection, policy enforcement, and flow-based charging based on the parameters set in the roaming pass, also indicated in the temporary roaming profile 138 of the UE 109. For example, the PCRF 132 may monitor traffic to and from the UE 109 and perform metering, data usage monitoring, throttling, or disabling of data roaming services/traffic policy enforcement based on the parameters set in the roaming pass. The OCS 135 may be a system or a communication function that allows the roaming provider to charge a user for services in real-time. The OCS 135 may be responsible for the account balance, rating, charging transaction control and correlation. If the roaming pass is pre-paid upon purchase of the roaming pass, the OCS 135 may monitor the data roaming services provided to the UE 109 to enforce the parameters set in the roaming pass. If the roaming pass is metered up to certain maximum values and then throttled or disabled, the OCS 135 may perform metering of data roaming usage and determine account charges accordingly. The PCRF 132 and the OCS 135 may monitor traffic flowing through the PGW 129 to and from the UE 109 to make decisions accordingly. The subscription data 141 may store data regarding subscribers that have registered with the roaming provider, and these subscribers may consider the roaming network 103 as their "home" network. For example, the subscription data 141 may include account or identification information regarding the subscribers, registered devices, subscription plan details, payment information, etc.

As shown in FIG. 1, the home core network 118 includes a HSS 147, a PCRF 150, a PGW 153, and an OCS 156. The HSS 147 may be similar to the HSS 123 in the roaming network 103, except that the HSS 147 is a database storing data related to users registered with the home network service provider. For example, the HSS 147 may store identify information (e.g., IMSIs or MSISDNs) of all registered devices under a subscription account. Other information stored in the HSS 147 may include services requested or rendered to the subscriber, general packet radio service settings of the subscriber, the current location of the subscriber, etc.

The PCRF 150, PGW 153, and OCS 156 in the home core network 118 may operate similarly to the PCRF 132, PGW 129, and OCS 135 in the roaming core network 117, except that the PGW 153 may connect the UE 109 to one or more packet data networks using a home APN. The home APN is different from the roaming APN. The subscription data 159 may be similar to the subscription data 141, except that the subscription data 159 describes subscribers of the home network 106.

While FIG. 1 shows the roaming core network 117 and the home core network 118 as including certain specific components, applications, services, and databases, it should be appreciated that both the roaming core network 117 and the home core network 118 may include other components, applications, services, and/or databases not otherwise shown in FIG. 1. Generally, the components in the system 100 of FIG. 1 relates to an LTE architecture. However, the components in the system 100 may otherwise relate to any other type of data communication architecture, having similar configuration servers or nodes (hardware or software) as the roaming application 120, MME 126, PGW 129 and 153, PCRF 132 and 150, OCS 135 and 156, and HSS 123 and 147. For example, when the system 100 is implemented as a 5G architecture, a unified data management (UDM) may be provisioned instead of the HSS 123, 147, an access and mobility management function (AMF) may be provisioned instead of the MME 126, a session management function (SMF)/user plane function (UPF) may be provisioned instead of a PGW 129, 153, and a packet data network (PDN) instance may be used instead of an APN.

Figure 2A:
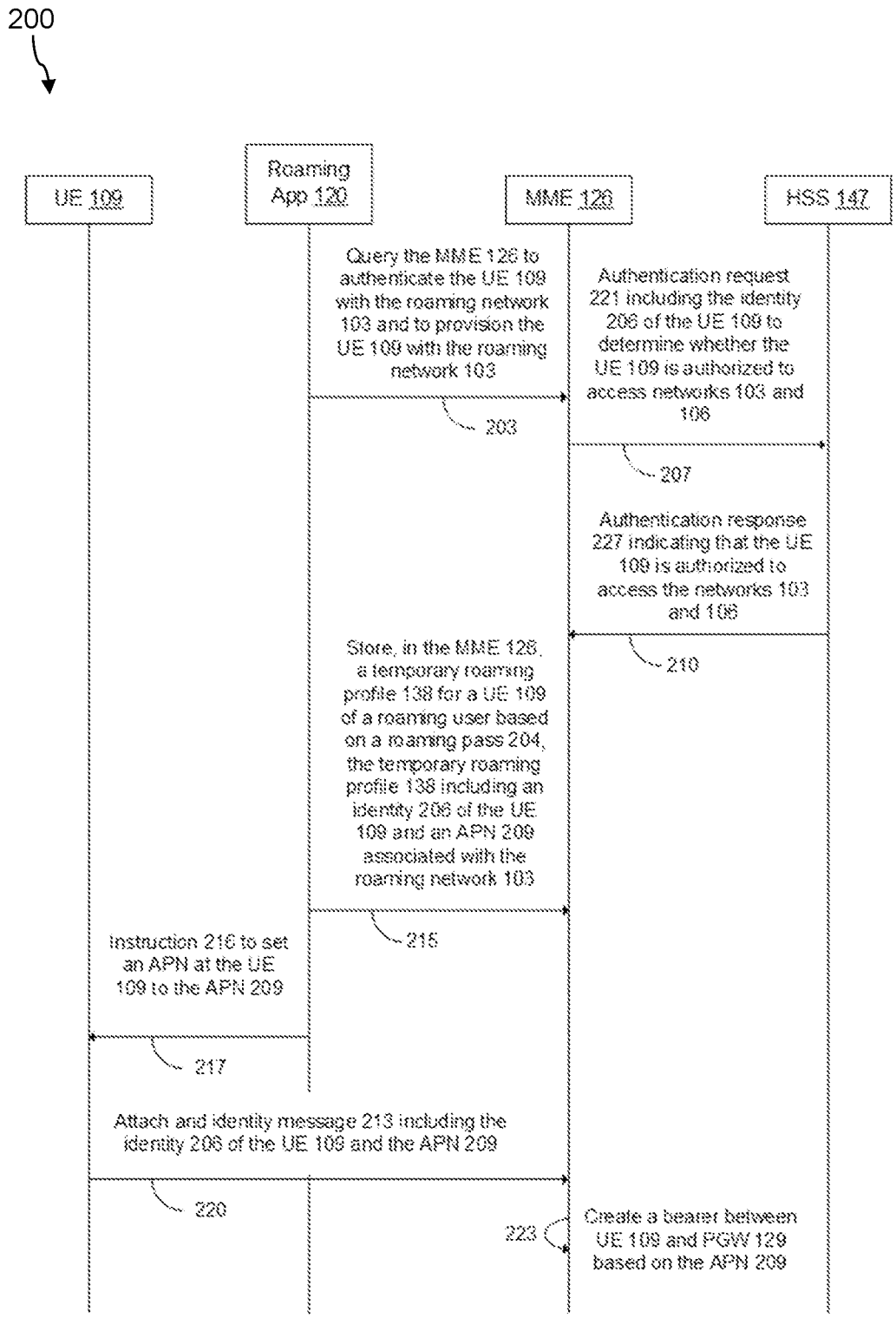
FIGS. 2A-B are message sequence diagrams of example methods performed by the communication system of FIG. 1 according to an embodiment of the disclosure.

Turning now to FIG. 2A, shown is a message sequence diagram illustrating a method 200 performed by the communications system of FIG. 1. In particular, method 200 is directed to the first embodiment described above, for devices that are capable of changing the APN at the device based on an instruction received from the roaming core network 117. As shown by FIG. 2A, method 200 may be performed by the UE 109, the roaming application 120, MME 126 of the roaming network 103, and HSS 147 of the home network 106. Method 200 may be performed during or after a roaming user has purchased a roaming pass for the UE 109 through a roaming provider. As described herein, the roaming pass may be used to receive data roaming services from the roaming network 103 instead of the home network 106.

At step 203, either the roaming application 120 may query the MME 126 to authenticate the UE 109 with the roaming network 103 and to provision the UE 109 with the roaming network 103 (e.g., add a temporary roaming profile 138 for the UE 109 to the MME 126). At step 207, the MME 126 may transmit an authentication request 221 to the HSS 147 at the home network 106, in which the authentication request 221 includes at least an identity 206 of the UE 109 (e.g., an MSISDN or IMSI of the UE 109). The HSS 147 may determine whether the UE 109 is registered with the home provider based on the identity 206 of the UE 109 and the subscription data 159 stored at the home core network 118. For example, the HSS 147 may determine that the IMSI of the UE 109 is indeed included in association with a subscription account of a subscriber of the home provider. The HSS 147 may also determine whether the roaming network 103 and the home network 106 are parties to a roaming agreement, whereby users of both networks 103 and 106 may roam into the other network 103 and 106 and use the network resources pursuant to a roaming pass or other arrangement.

At step 210, the HSS 147 may transmit an authentication response 227 back to the MME 126. When the HSS 147 determines that the UE 109 is registered with the home network 106 and that the home network 106 and/or that the roaming network 103 are parties to a roaming agreement, the HSS 147 may transmit an authentication response 227 back to the MME 126 indicating that the UE 109 is authorized to access both the home network 106 and the roaming network 103. When the HSS 147 determines that the UE 109 is not registered with the home network 106 or that the home network 106 and/or that the roaming network 103 are parties to a roaming agreement, the HSS 147 may transmit an authentication response 227 back to the MME 126 indicating that the UE 109 is not authorized to access both the home network 106 and the roaming network 103.

When the UE 109 is permitted to be provisioned on the roaming network 103, method 200 proceeds to step 215. When the UE 109 is not to be provisioned on the roaming network 103, method 200 ends.

At step 215, the roaming application 120 may create and store, in the MME 126, a temporary roaming profile 138 for the UE 109 based on the roaming pass 204 created for the UE 109. The temporary roaming profile 138 may include, for example, the identity 206 of the UE 109 (MSISDN or IMSI of the UE 109) and an APN 209 assigned to the roaming network 103.

At step 217, the roaming application 120 may transmit an instruction 216 to set an APN at the UE 109 to the roaming APN 209. The instruction 216 may include the roaming APN 209 and any information from the temporary roaming profile 138. In an embodiment, the UE 109 may be automatically triggered to change the APN setting of the UE 109, for example, when the UE 109 enters the coverage area of the roaming network 103 and/or when a start time of the roaming pass 204 (as selected/entered upon purchase of the roaming pass) has passed. In another embodiment, a notification may be displayed on the UE 109 instructing the user to manually change the APN setting of the UE 109.

Subsequently at step 220, the UE 109 may travel into the coverage area supported by the roaming network 103 after the roaming pass 204 has been purchased for the UE 109, and the UE 109 may automatically begin to attach to the roaming network 103. In this case, the UE 109 may transmit an attach message 213 to the MME 126 and request attachment to a packet data network and thus, access to the Internet. The attach message 213 may include the identity 206 of the UE 109 and the roaming APN 209. The attach message 213 is described herein as a single message, but may be implemented as multiple messages, as should be appreciated herein. At step 223, the MME 126 may use the APN 209 received in the attach message 213 to provide a data roaming connection to the UE 109. For example, the MME 126 may create a bearer between UE 109 and PGW 129 based on the APN 209 to provide the data roaming connection to the UE 109 via the roaming network 103 instead of the home network 106.

Figure 2B:
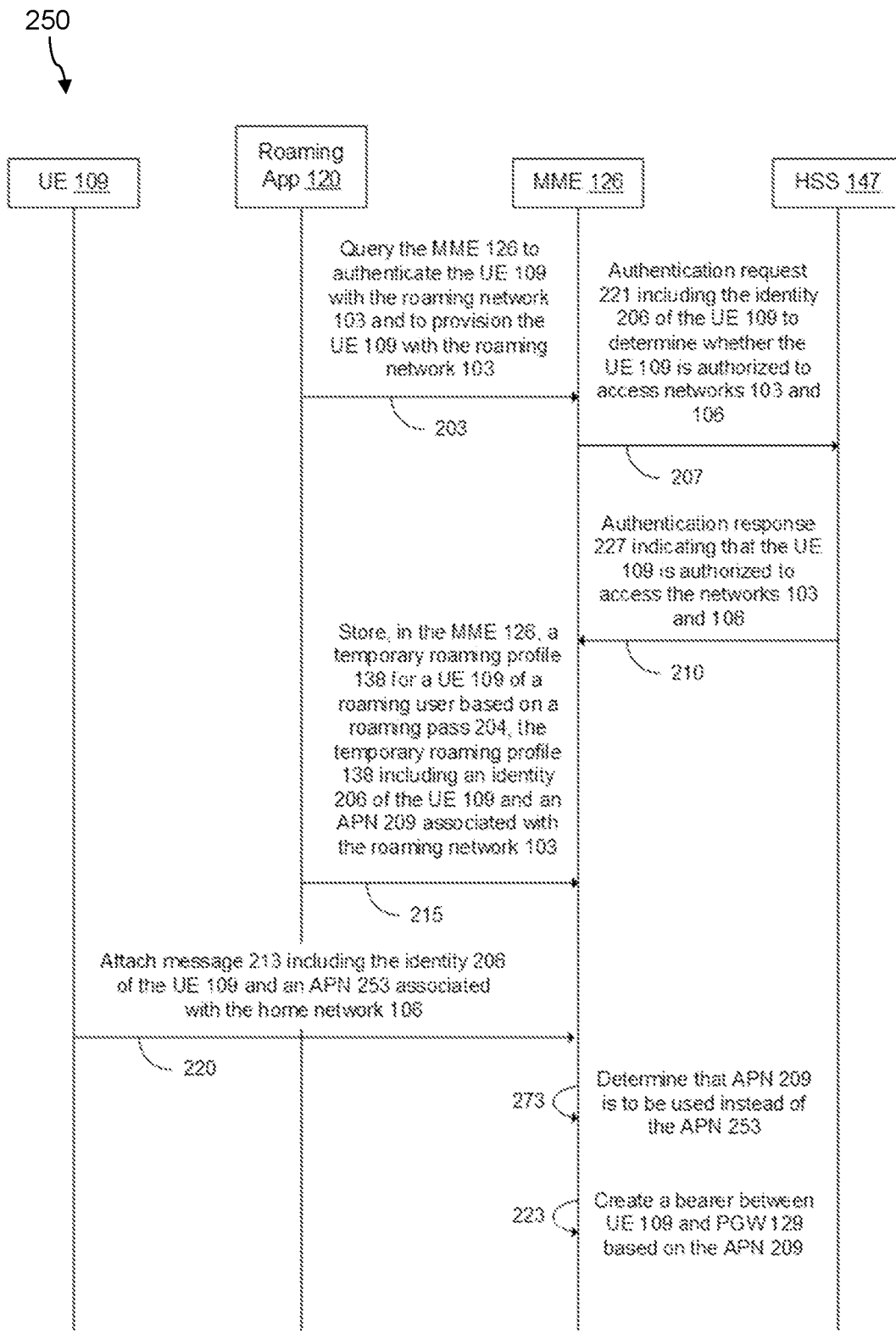

Referring now to FIG. 2B, shown is a message sequence diagram illustrating a method 250 performed by the communications system 100. In particular, method 250 is directed to the second embodiment described above, for devices that are prohibited or not capable of changing the APN at the device. Similar to method 200 in FIG. 2A, method 250 may be performed by the UE 109, the roaming application 120, and MME 126 of the roaming network 103, and HSS 147 of the home network 106. Method 250 may also be performed during or after a roaming user has purchased a roaming pass for the UE 109 through a roaming provider.

Steps 203, 207, 210, and 215 in method 250 of FIG. 2B are similar to the steps 203, 207, 210, 212, and 215 in method 200 of FIG. 2A. However, at step 220, the attach message 213 sent by the UE 109 to the MME 126 may include the APN 253 associated with the home network 106 instead of the APN 209 associated with the roaming network 103. This may be because the UE 109 is by default preprogrammed to maintain the APN 253 of the home network 106, and as such, all attach messages 213 sent by a UE 109 that is not capable of altering the APN may include the APN 253 of the home network 106.

However, the MME 126 may still be able to connect the UE 109 to the packet data network via the roaming network 103 instead of the home network 106 when a UE 109 is requesting roaming services since details on the roaming APN 209 are stored at the MME 126, in association with the temporary roaming profile 138 of the UE 109. In this way, at step 273, the MME 126 may then obtain the roaming APN 209 from the temporary roaming profile 138 created for the UE 109. The MME 126 may then compare the APN 253 associated with the home network 106 and carried in the attach message 213 with the roaming APN 209 indicated in the temporary roaming profile 138. When the APN 253 associated with the home network 106 is different from the roaming APN 209 indicated in the temporary roaming profile 138, the MME 126 may, by default, use the roaming APN 209 indicated in the temporary roaming profile 138 to set up a data connection for the UE 109. As described above, at step 223, the MME 126 may then establish a data connection for the UE 109 using the roaming network 103 by creating a bearer between the UE 109 and the PGW 129 of the roaming network 103 based on the roaming APN 209.

Tethering services when roaming may also be performed according the method 250 shown in FIG. 2B. Tethering refers to using the data connection at the UE 109 to connect another device to the Internet. In this way, when the UE 109 is roaming in the coverage area provided by the roaming network 103, the roaming network 103 may provide the UE 109 access to the Internet via the PGW 129 of the roaming network 103 using the roaming APN 209. The devices connected to the UE 109 and using the data connection at the UE 109 to access the Internet may similarly access the Internet via the PGW 129 of the roaming network 103 using the roaming APN 209.

Figure 3:
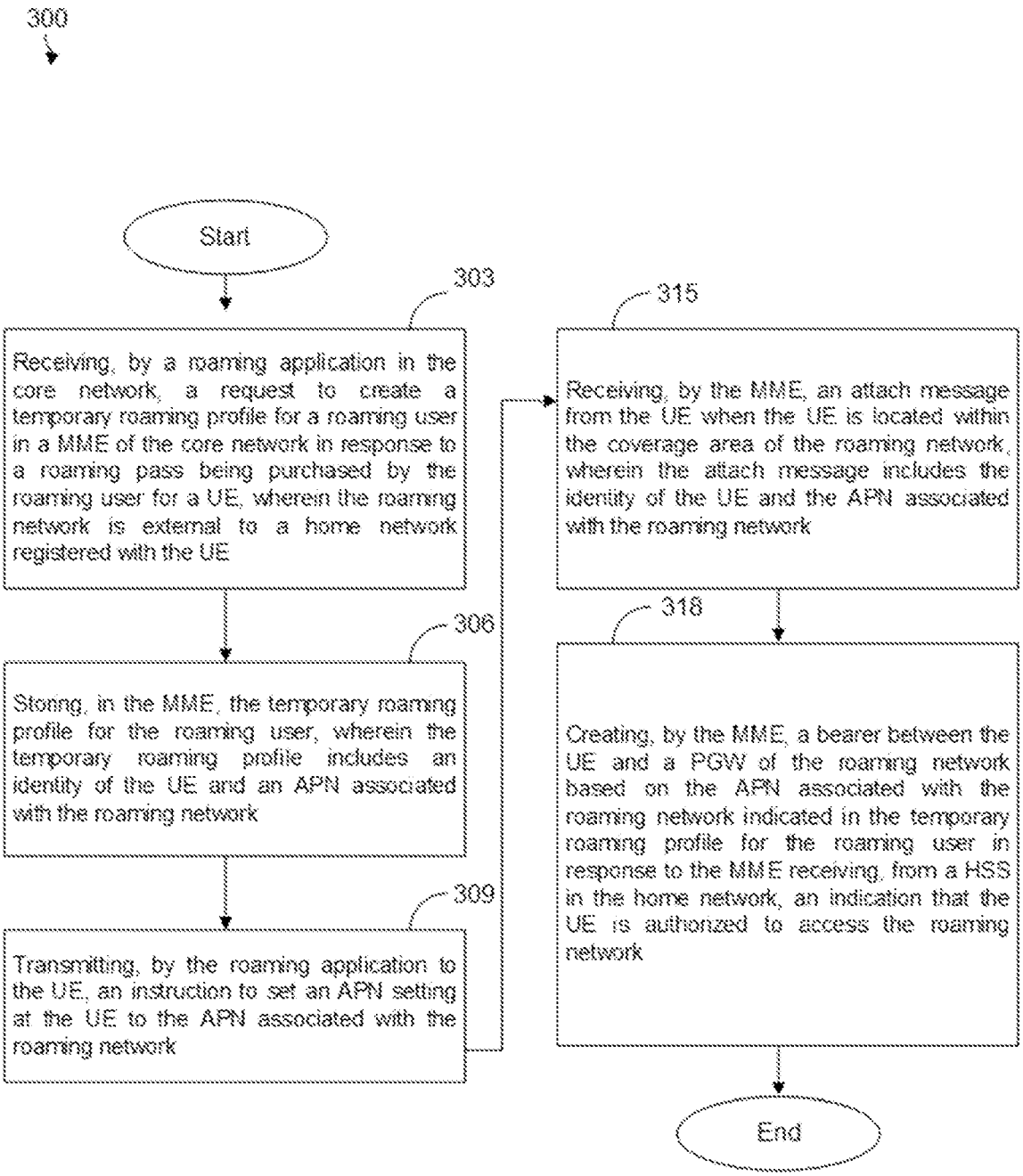
FIG. 3 is a flow chart of a first method performed by the system of FIG. 1 according to an embodiment of the disclosure.

Turning now to FIG. 3, a method 300 is described. Method 300 is performed by the roaming core network 117 in the communications system 100 of FIG. 1. Method 300 may be performed in response to a roaming user purchasing a roaming pass 204 for a UE 109. As mentioned above, when purchasing the roaming pass 204, the user may select or enter various parameters for the roaming pass 205, such as, for example, a duration of the roaming pass 204, QoS criterion for the roaming pass, a maximum or unlimited bandwidth usage, etc.

At step 303, method 300 comprises receiving, by a roaming application 120, a request to create a temporary roaming profile 138 for a roaming user in a MME 126 of the roaming core network 117. Step 303 may be performed in response to a roaming pass 204 being purchased for the UE 109. The roaming network 103 may be outside of or external to the home network 106 with which the UE 109 is registered.

At step 306, method 300 comprises storing, in the MME 126, the temporary roaming profile 138 for the UE 109 of the roaming user. The temporary roaming profile 138 may include the identity 206 of the UE 109 and a roaming APN 209 registered with the roaming network 103.

At step 309, method 300 comprises transmitting, by the roaming application 120, to the UE 109, an instruction 216 to set an APN setting at the UE to the roaming APN 209. At step 315, method 300 comprises receiving, by the MME 126 in the roaming core network 117, an attach message 213 from the UE 109 when the UE 109 is located within the coverage area of the roaming network 103. The attach message 213 may include the identity 206 of the UE 109 and the roaming APN 209 associated with the roaming network 103.

At step 318, method 300 comprises creating, by the MME 126, a bearer between the UE 109 and the PGW 129 based on the roaming APN 209 indicated in the temporary roaming profile 138 for the roaming user. Step 318 may be performed in response to the MME 126 receiving, from the HSS 147 in the home network 106, an indication that the UE 109 is authorized to access home network 106 and the roaming network 103. As described above with reference to FIGS. 2A, the HSS 147 may determine whether the UE 109 is authorized to access the home network 106 and the roaming network 103 based on subscription data 159 at the home core network 118 and/or whether a roaming agreement exists between the roaming network 103 and the home network 106.

In some embodiments, method 300 may comprise additional attributes and steps not otherwise shown in FIG. 3. In an embodiment, the roaming pass 204 may permit the UE 109 to access the packet data network via the roaming network 103 for a duration of time, and the duration of time is indicated in the temporary roaming profile 138 stored at the MME 126. In an embodiment, the temporary roaming profile 138 includes the identity 206 of the UE 104, the home wireless provider, a country associated with the home wireless provider, and a payment history for the roaming pass. In an embodiment, the instruction 216 is to replace an APN associated with the home network with the roaming APN 209. In an embodiment, method 300 may further comprise metering, by a PCRF 132 in the roaming core network 117, data roaming usage at the UE 109 based on parameters specified in the roaming pass 204, and/or authorizing, by an OCS 135 in the roaming core network 117, resources in the roaming network 103 according to parameters included in the roaming pass 204. In an embodiment, method 300 may further comprise determining whether the roaming network 103 and the home network 106 operate according to a roaming agreement in which the roaming user is permitted to access a packet data network via the roaming network 103 instead of the home network 106. In an embodiment, when the roaming network 103 and the home network 106 operate according to a roaming agreement in which the roaming user is permitted to access the packet data network via the roaming network 103 instead of the home network 106, method 300 may further comprise transmitting, by the MME 126 in the roaming network 103 to the HSS 147 in the home network 106, an authentication request 221 comprising identity 206 of the UE 109 to determine whether the UE 109 is authorized to access the home network 106 and the roaming network 103, and receiving, by the MME 126 in the roaming network 103 from the HSS 147 in the home network 106, an authentication response 227 indicating that the UE 109 is authorized to access the home network 106 and the roaming network 103 based on a subscription plan of the UE 109 with a home wireless service provider.

Figure 4:
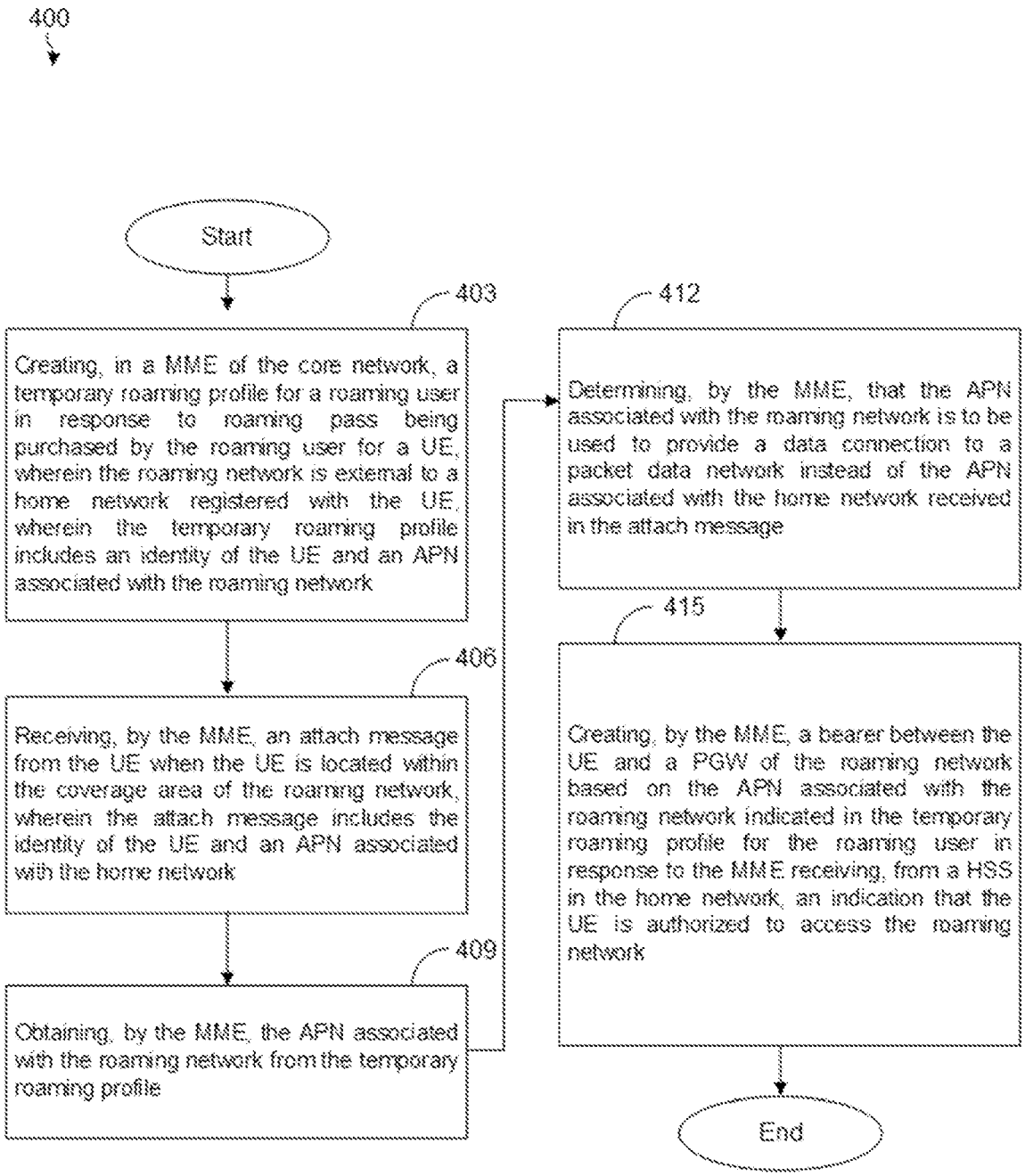
FIG. 4 is a flow chart of a second method performed by the system of FIG. 1 according to an embodiment of the disclosure.

Turning now to FIG. 4, a method 400 is described. Method 400 is performed by the roaming core network 117 in the communications system 100 of FIG. 1. Method 400 may be performed in response to a roaming user purchasing a roaming pass 204 for a UE 109.

At step 403, method 400 comprises creating, in a MME 126 of the roaming core network 117, a temporary roaming profile 138 for a roaming user. Step 403 may be performed in response to a roaming pass 204 being purchased for the UE 109. The roaming network 103 may be outside of or external to the home network 106 with which the UE 109 is registered. The temporary roaming profile 138 may include an identity 206 of the UE 109 and a roaming APN 209 registered in the roaming network 106.

At step 406, method 400 comprises receiving, by the MME 126 in the roaming core network 117, an attach message 213 from the UE 109 when the UE 109 is located within the coverage area of the roaming network 103. The attach message 213 may include the identity 206 of the UE 109 and an APN associated with the home network 106.

At step 409, method 400 comprises obtaining, by the MME 126, the roaming APN 209 associated with the roaming network 106 from the temporary roaming profile 138. At step 412, method 400 comprises determining, by the MME 126, that the roaming APN 209 is to be used to provide a data connection to a packet data network instead of the APN associated with the home network 106 received in the attach message 213.

At step 415, method 400 comprises creating, by the MME 126, a bearer between the UE 109 and the PGW 129 based on the roaming APN 209 indicated in the temporary roaming profile 138 for the roaming user. Step 415 may be performed in response to the MME 126 receiving, from the HSS 147 in the home network 106, an indication that the UE 109 is authorized to access home network 106 and the roaming network 103. As described above with reference to FIGS. 2A, the HSS 147 may determine whether the UE 109 is authorized to access the home network 106 and the roaming network 103 based on subscription data 159 at the home core network 118 and/or whether a roaming agreement exists between the roaming network 103 and the home network 106.

In some embodiments, method 400 may comprise additional attributes and steps not otherwise shown in FIG. 4. In an embodiment, the roaming pass 204 may include a parameter by which to use resources in the roaming network to provide data roaming services to the UE 109, and the parameter may indicate at least one of a QoS criteria, maximum amount of bandwidth, latency requirement, or a throttling rule.

Figure 5A:
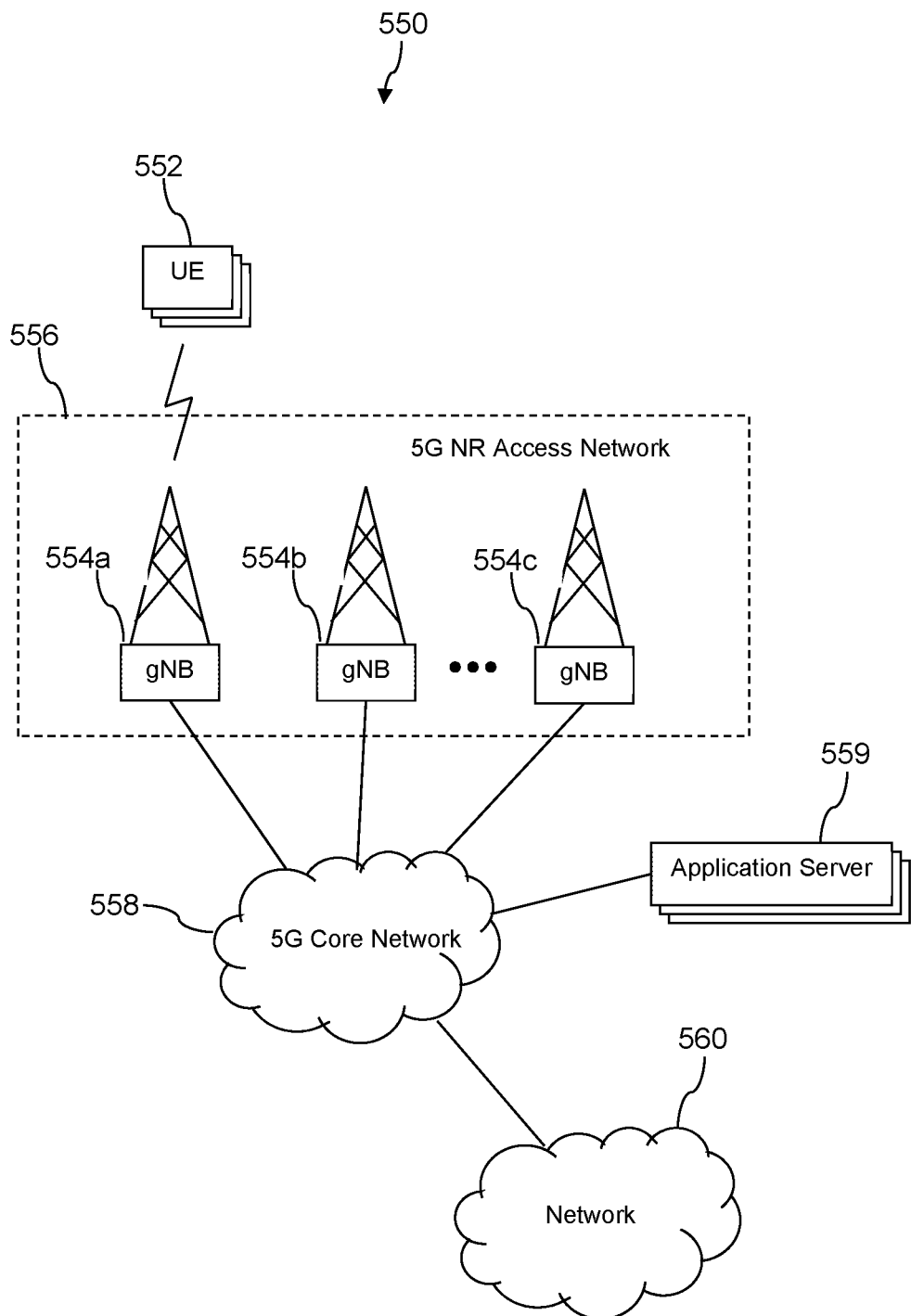
FIGS. 5A-B are block diagrams illustrating a communication system similar to the communication system of FIG. 1 according to an embodiment of the disclosure.

Turning now to FIG. 5A, an exemplary communication system 550 is described. In an embodiment, the communication system 550 may be implemented in the system 100 of FIG. 1. The communication system 550 includes a number of access nodes 554 that are configured to provide coverage in which UEs 552, such as cell phones, tablet computers, machine-type-communication devices, tracking devices, embedded wireless modules, and/or other wirelessly equipped communication devices (whether or not user operated), or devices such as the carrier hotspot device 105, can operate. The access nodes 554 may be said to establish an access network 556. The access network 556 may be referred to as RAN in some contexts. In a 5G technology generation an access node 554 may be referred to as a gigabit Node B (gNB). In 4G technology (e.g., LTE technology) an access node 554 may be referred to as an eNB. In 3G technology (e.g., CDMA and GSM) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G" -such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 5B:
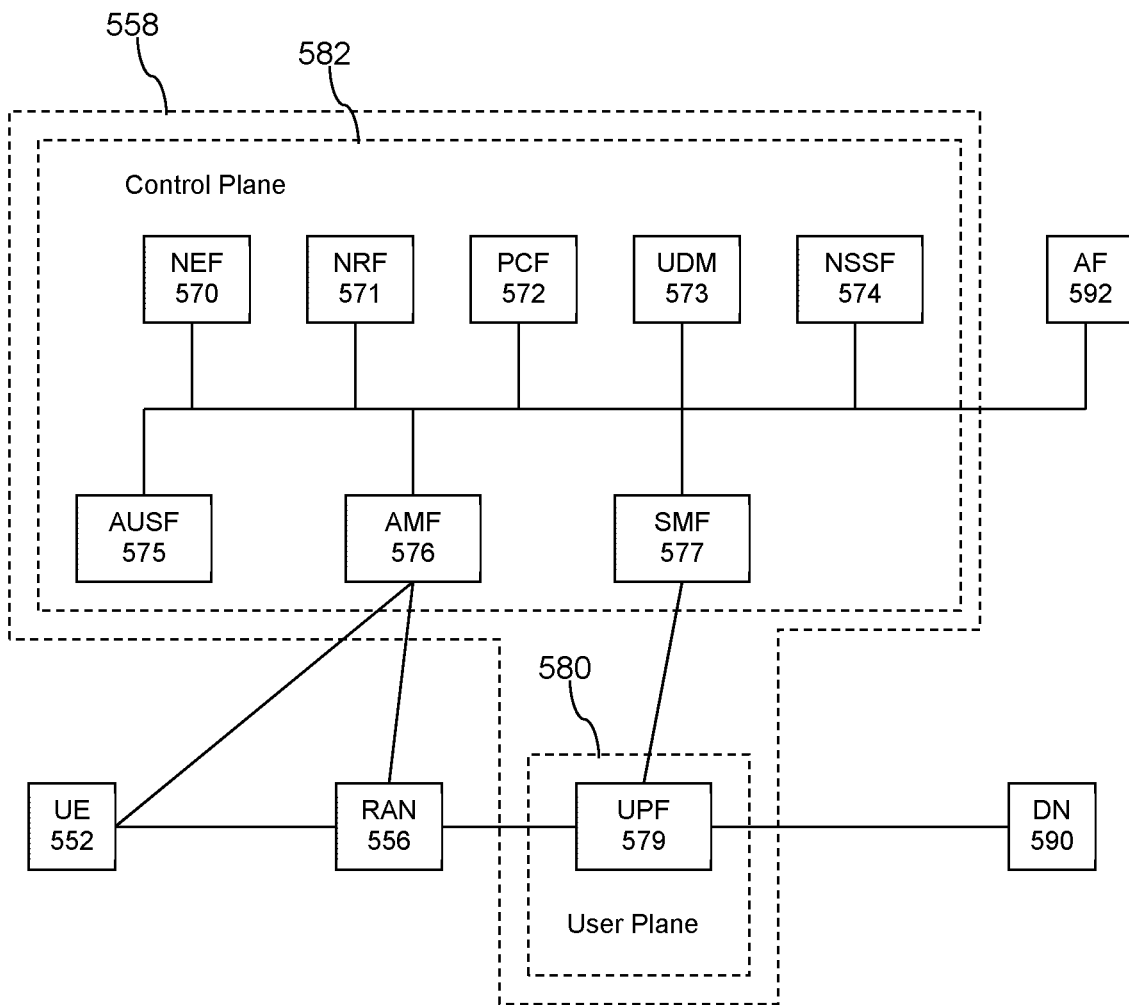

Turning now to FIG. 5B, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, an MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 5A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be executed on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 6:
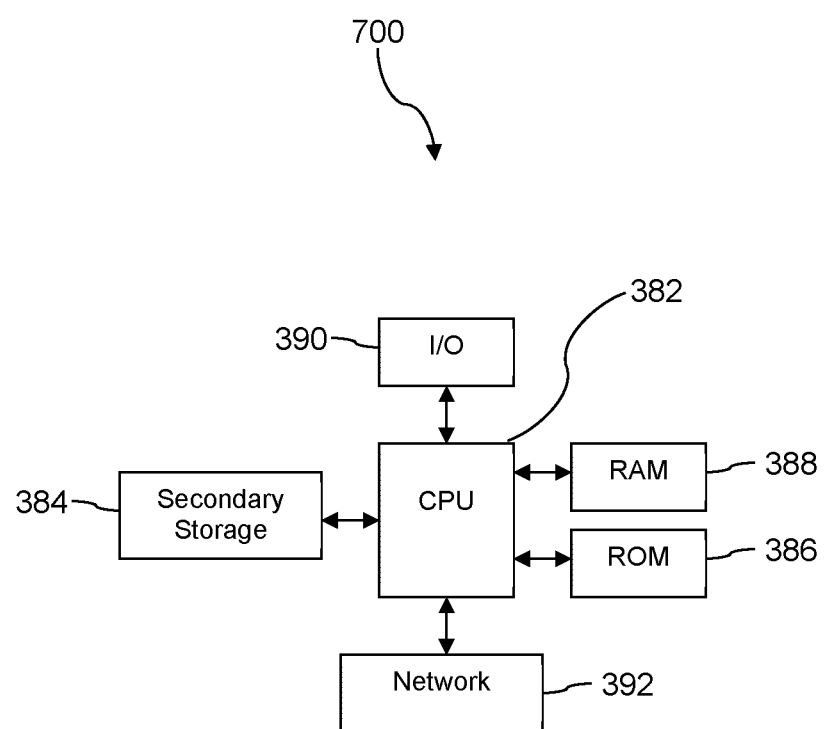
FIG. 6 is a block diagram of a computer system implemented within the communication system of FIG. 1 according to an embodiment of the disclosure.

FIG. 6 illustrates a computer system 700 suitable for implementing one or more embodiments disclosed herein. In an embodiment, the UE 109, the core network 110, and/or the core authentication application 128 may be implemented as the computer system 700. The computer system 700 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 700, at least one of the CPU 382, the RAM 388, and the ROM 386 are changed, transforming the computer system 700 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 700 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 700 to provide the functionality of a number of servers that is not directly bound to the number of computers in the computer system 700. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 700, at least portions of the contents of the computer program product to the secondary storage 384, to the ROM 386, to the RAM 388, and/or to other non-volatile memory and volatile memory of the computer system 700. The processor 382 may process the executable instructions in part by directly accessing the computer program product, for example by reading from a CD-ROM disk inserted into a disk drive peripheral of the computer system 700. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 700.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 700 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method performed by a core network in a roaming network associated with a roaming wireless service provider, wherein the method comprises:
   creating, in a mobile management entity (MME) of the core network, a temporary roaming profile for a roaming user in response to roaming pass being purchased by the roaming user for a user equipment (UE), wherein the roaming network is external to a home network registered with the UE, wherein the temporary roaming profile includes an identity of the UE and an access point name (APN) associated with the roaming network;
   receiving, by the MME, an attach message from the UE when the UE is located within a coverage area of the roaming network, wherein the attach message includes the identity of the UE and an APN associated with the home network;
   obtaining, by the MME, the APN associated with the roaming network from the temporary roaming profile;
   determining, by the MME, that the APN associated with the roaming network is to be used to provide a data connection to a packet data network instead of the APN associated with the home network received in the attach message;
   creating, by the MME, a bearer between the UE and a packet network data gateway (PGW) of the roaming network based on the APN associated with the roaming network indicated in the temporary roaming profile for the roaming user in response to the MME receiving, from a home subscriber service (HSS) in the home network, an indication that the UE is authorized to access the roaming network; and
   when the roaming network and the home network operate according to a roaming agreement in which the roaming user is permitted to access the packet data network via the roaming network instead of the home network:
   transmitting, by the ME in the roaming network to the HSS in the home network, an authentication request comprising the identity of the UE to determine whether the UE is authorized to access the roaming network; and
   receiving, by the MME in the roaming network from the HSS in the home network, an authentication response indicating that the UE is authorized to access the roaming network based on a subscription plan of the UE with a home wireless service provider.

2. The method of claim 1, wherein the roaming pass includes a parameter by which to use resources in the roaming network to provide data roaming services to the UE, and wherein the parameter indicates at least one of a quality of service (QoS) criteria, maximum amount of bandwidth, latency requirement, or a throttling rule.

3. The method of claim 1, wherein the temporary roaming profile includes the identity of the UE, a home wireless provider, a country associated with the home wireless provider, and a payment history for the roaming pass.

4. The method of claim 1, further comprising metering, by a policy and charging rules function (PCRF) of the roaming network, data roaming usage at the UE based on parameters included in the roaming pass.

5. The method of claim 1, further comprising authorizing, by an online charging system in the roaming network, resources in the roaming network according to parameters included in the roaming pass.

6. A method performed by a core network in a roaming network associated with a roaming wireless service provider, wherein the method comprises:
   receiving, by a roaming application in the core network, a request to create a temporary roaming profile for a roaming user in a mobile management entity (MME) of the core network in response to a roaming pass being purchased by the roaming user for a user equipment (UE), wherein the roaming network is external to a home network registered with the UE;
   storing, in the MME, the temporary roaming profile for the roaming user, wherein the temporary roaming profile includes an identity of the UE and an access point name (APN) associated with the roaming network;

transmitting, by the roaming application to the UE, an instruction to set an APN setting at the UE to the APN associated with the roaming network;

receiving, by the MME in the core network, an attach message from the UE when the UE is located within a coverage area of the roaming network, wherein the attach message includes the identity of the UE and the APN associated with the roaming network;

creating, by the MME, a bearer between the UE and a packet network data gateway (PGW) of the roaming network based on the APN associated with the roaming network indicated in the temporary roaming profile for the roaming user in response to the MME receiving, from a home subscriber server (HSS) in the home network, an indication that the UE is authorized to access the roaming network; and when the roaming network and the home network operate according to a roaming agreement in which the roaming user is permitted to access a packet data network via the roaming network instead of the home network:

transmitting, by the MME in the roaming network to the HSS in the home network, an authentication request comprising the identity of the UE to determine whether the UE is authorized to access the roaming network; and receiving, by the MME in the roaming network from the HSS in the home network, an authentication response indicating that the UE is authorized to access the roaming network based on a subscription plan of the UE with a home wireless service provider.

7. The method of claim 6, wherein the roaming pass permits the UE to access the packet data network via the roaming network for a duration of time, and wherein the duration of time is indicated in the temporary roaming profile stored at the MME.

8. The method of claim 6, wherein the temporary roaming profile includes the identity of the UE, a home wireless provider, a country associated with the home wireless provider, and a payment history for the roaming pass.

9. The method of claim 6, wherein the instruction is to replace an APN associated with the home network with the APN associated with the roaming network in the APN setting.

10. The method of claim 6, further comprising:
metering, by a policy and charging rules function (PCRF) of the roaming network, data roaming usage at the UE based on parameters included in the roaming pass; and
authorizing, by an online charging system in the roaming network, resources in the roaming network according to parameters included in the roaming pass.

11. The method of claim 6, further comprising determining whether the roaming network and the home network operate according to the roaming agreement in which the roaming user is permitted to access the packet data network via the roaming network instead of the home network.

12. A system comprising:
a core network located within a roaming network, wherein the core network comprises:
at least one processor;
at least one non-transitory memory;
a mobility management entity (MME);
a roaming application, stored in the at least one non-transitory memory, which when executed by the at least one processor, causes the at least one processor to be configured to:

receive a request to create a temporary roaming profile for a roaming user in the MME in response to a roaming pass being purchased by the roaming user for a user equipment (UE), wherein the roaming network is external to a home network registered with the UE;

store, in the MME, the temporary roaming profile for the roaming user, wherein the temporary roaming profile includes an identity of the UE and an access point name (APN) associated with the roaming network;

receive an attach message from the UE when the UE is located within a coverage area of the roaming network, wherein the attach message includes the identity of the UE;

create a bearer between the UE and a packet network data gateway (PGW) of the roaming network based on the APN associated with the roaming network indicated in the temporary roaming profile for the roaming user in response to an indication that the UE is authorized to access the home network and the roaming network being received from a home subscriber server (HSS) in the home network; and when the roaming network and the home network operate according to a roaming agreement in which the roaming user is permitted to access a packet data network via the roaming network instead of the home network:

transmit, to the HSS in the home network, an authentication request comprising the identity of the UE to determine whether the UE is authorized to access the roaming network; and receive, from the HSS in the home network, an authentication response indicating that the UE is authorized to access the roaming network based on a subscription plan of the UE with a home wireless service provider.

13. The system of claim 12, wherein an operating system of the UE permits the APN setting at the UE to be adjusted, wherein the roaming application, when executed by the at least one processor, causes the at least one processor to be configured to transmit, to the UE, an instruction to set the APN setting at the UE to the APN associated with the roaming network.

14. The system of claim 12, wherein an operating system of the UE prohibits the APN setting at the UE to be adjusted, wherein the attach message includes an APN associated with the home network, wherein the roaming application, when executed by the at least one processor, causes the at least one processor to:
determine the APN associated with the roaming network is to be used to provide a data connection to the packet data network instead of the APN associated with the home network received in the attach message.

15. The system of claim 12, wherein the roaming pass includes a policy by which to use resources in the roaming network to forward traffic to and from the UE, and wherein the policy indicates at least one of a quality of service (QoS) parameter, maximum amount of bandwidth, latency requirement, or a throttling rule.

16. The system of claim 12, wherein the roaming pass permits the UE to access the packet data network via the roaming network for a duration of time, and wherein the duration of time is indicated in the temporary roaming profile stored at the MME, and wherein the bearer is established only for the duration of time.

17. The system of claim 12, wherein the temporary roaming profile includes the identity of the UE, a home wireless provider, a country associated with the home wireless provider, and a payment history for the roaming pass.

18. The system of claim 12, wherein the roaming application, when executed by the at least one processor, causes the at least one processor to determine whether the roaming network and the home network operate according to the roaming agreement in which the roaming user is permitted to access the packet data network via the roaming network instead of the home network.

\* \* \* \* \*